Figure 3:
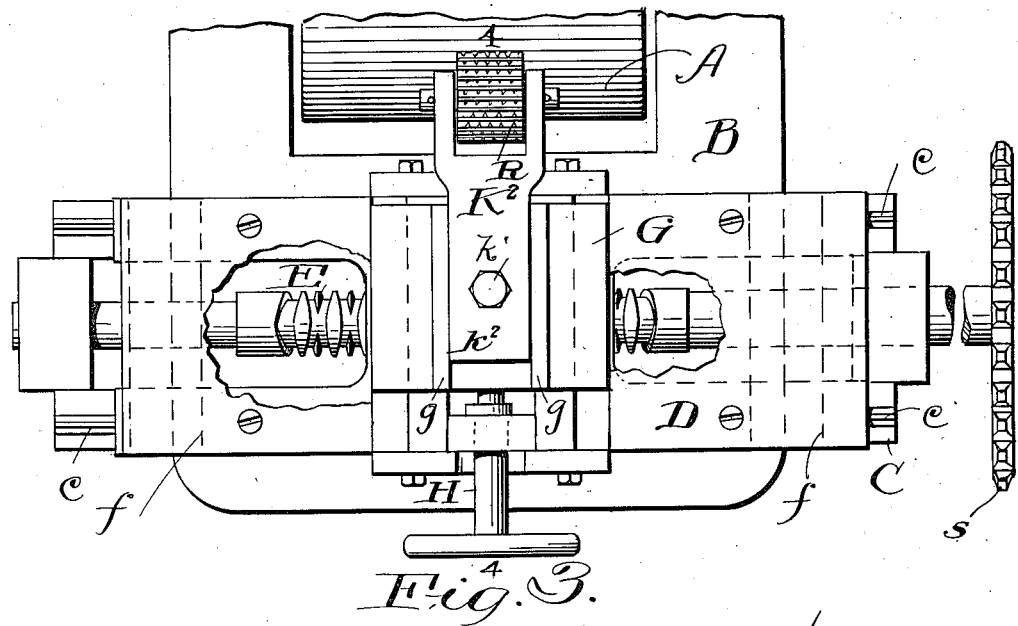

D. I. STERLING.
GRINDSTONE ATTACHMENT.
APPLICATION FILED APR. 20, 1906.
981,810.
Patented Jan. 17, 1911.
2 SHEETS—SHEET 1.
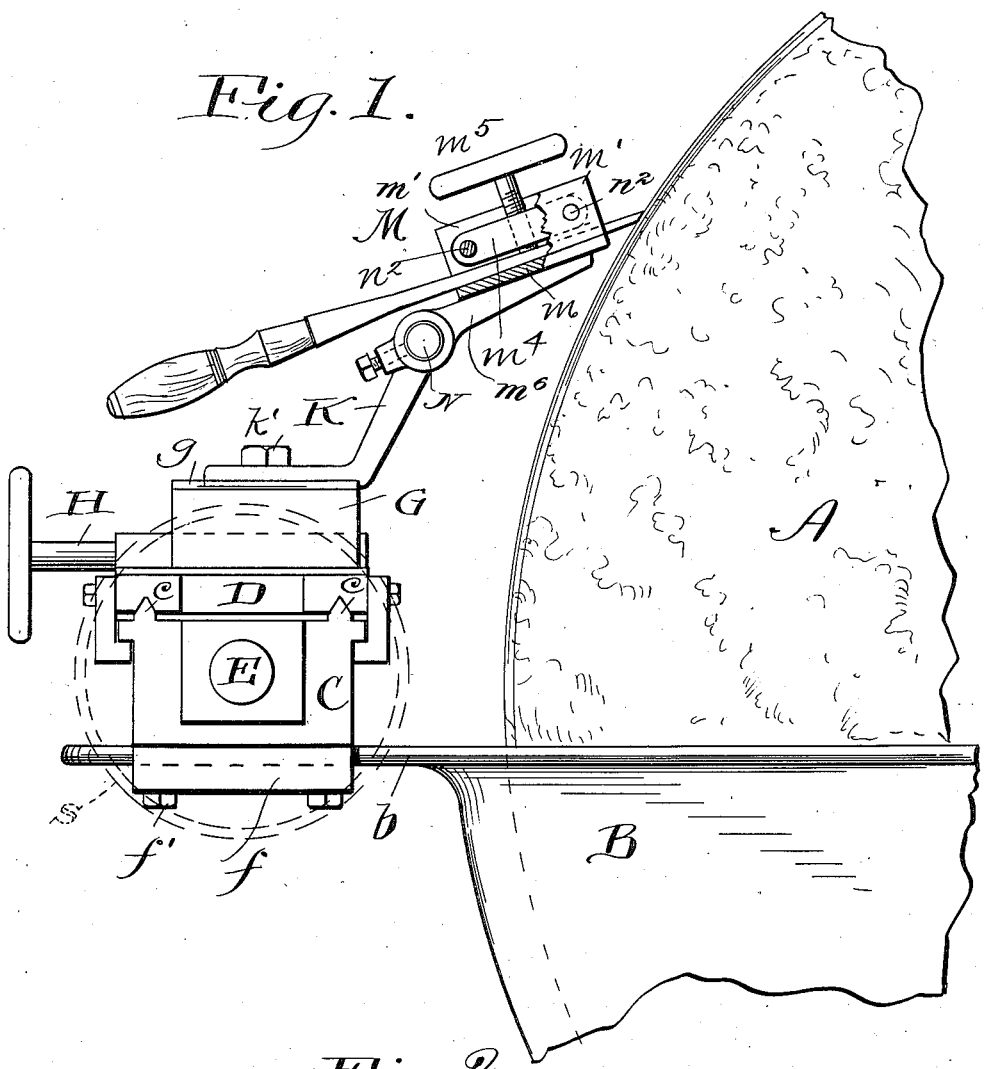
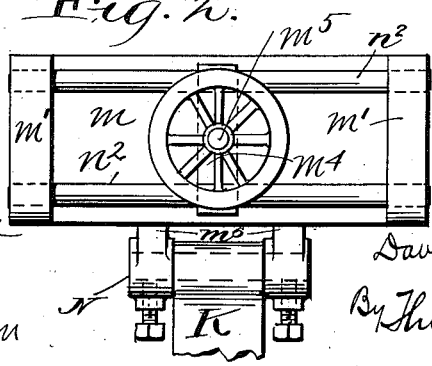

D. I. STERLING.
GRINDSTONE ATTACHMENT.
APPLICATION FILED APR. 20, 1906

981,810.

Patented Jan. 17, 1911.

2 SHEETS—SHEET 2.

Witnesses.
E. B. Gilchrist
H. C. Sullivan

Inventor.
David I. Sterling
By Thurston Woodward
Attys

UNITED STATES PATENT OFFICE.

DAVID I. STERLING, OF BEREA, OHIO, ASSIGNOR TO THE CLEVELAND STONE COMPANY, OF CLEVELAND, OHIO, A CORPORATION OF OHIO.

GRINDSTONE ATTACHMENT.

981,810.     Specification of Letters Patent.     Patented Jan. 17, 1911.

Application filed April 20, 1906. Serial No. 312,746.

*To all whom it may concern:*

Be it known that I, DAVID I. STERLING, a citizen of the United States, residing at Berea, in the county of Cuyahoga and State of Ohio, have invented a certain new and useful Improvement in Grindstone Attachments, of which the following is a full, clear, and exact description.

The object of this invention is to provide means whereby the unskilled owner of a grindstone may keep its grinding face properly dressed and may sharpen tools thereon as well as an expert.

The invention may be summarized as the combination of parts hereinafter described and pointed out definitely in the claim.

In the drawing, Figure 1 is a side elevation of the attachment, and so much of a grindstone and its frame as is necessary to understand the invention. Fig. 2 is a plan view of the tool holder shown in Fig. 1, Fig. 3, a plan view (partly broken away) of a modification of the attachment which supports the tool holder, and Fig. 4 is a sectional view of the same in the plane indicated by line 4—4 of Fig. 3.

Referring to the parts by letters, A represents the grind stone, and B the frame upon which the stone is rotatably mounted. These two elements are not shown completely, because there is nothing novel about their construction or combination, except that the frame has, adjacent to one edge of the stone, a substantially horizontal shelf $b$ to support the attachment.

The attachment consists of a base C which rests upon the shelf $b$ and is clamped thereto by a clamping plate $f$ which extends beneath said shelf and is secured to the base by bolts $f'$. This base has on its upper face the ways $c$ on which a carriage D is movable in a path parallel with the axis of the grind stone. A feed shaft E is mounted in the base beneath the carriage D. This shaft has a right and left hand endless screw thread cut in it which extends in one direction from end to end, and then in the reverse direction backward, the latter threads intersecting the former and both threads being joined at both ends thereof. A U-shaped piece P engages, on the upper side of this shaft, with the spiral grooves therein, this U-shaped piece being swiveled on pivot pin $p$ to the under side of the carriage whereby it is able to maintain its engagement in the spiral grooves.

Upon the carriage D a tool holding slide G is mounted in guideways by which said slide is constrained to move in a path at right angles to the movement of the carriage, which path is toward and from the peripheral grinding face of the grindstone. An adjusting screw H mounted in one edge of the carriage and constrained against endwise movement therein, screws through a lug $e$ on the under side of the slide and thereby furnishes the means whereby said slide may be moved toward and from the grindstone, and held in position.

On the top of the slide G are two separate ribs $g$ $g$ which are parallel with each other and with the path in which the slide moves. The shank $k$ of a tool holder K, as shown in Figs. 1 and 2, is fitted between these ribs and is secured upon the slide by means of a bolt $k'$.

Figure 4:
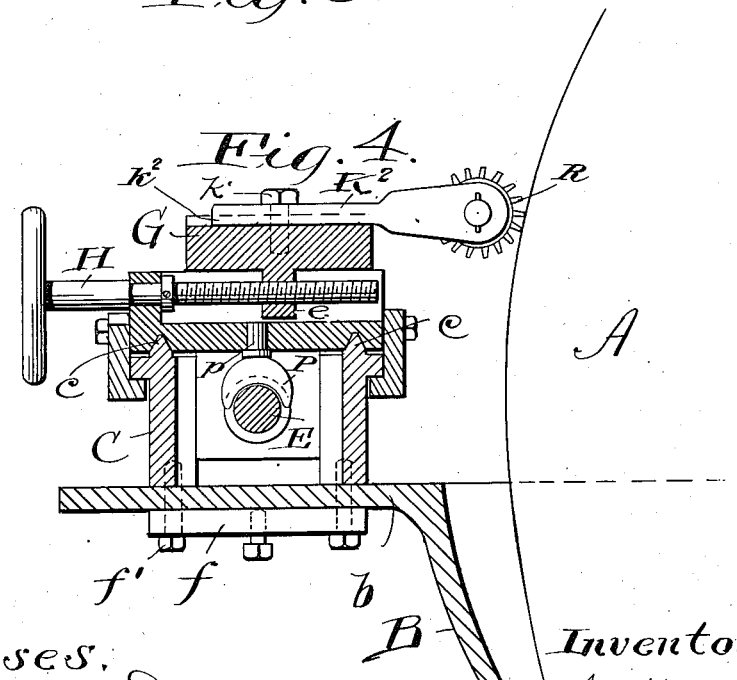

The tool holder may have freely mounted in its end adjacent to the grind stone, as shown in Figs. 3 and 4, a dressing roll R adapted when in engagement with the grindstone to dress off its face. This particular tool holder may be removed and another tool holder $K^2$ substantially such as is shown in Figs. 1 and 2 may be substituted and secured by its base $K^2$ in like manner to the slide. This latter tool holder includes a tool clamp M having arms $m^6$ adjustably secured on a horizontal pivot N to the end of the tool holder shank. This tool clamp consists of a plate $m$ having end flanges $m'$ between which extend the two parallel rods $n^2$. These rods pass through holes in a slide $m^4$ through which a clamping screw $m^5$ is screwed.

On the end of the feed screw a sprocket wheel S is preferably secured, and this sprocket wheel is adapted to be connected by means of a sprocket chain with a similar sprocket wheel on the end of the grind stone shaft, or other driving mechanism.

One man may, after properly adjusting the tool holder and the tool therein, and moving the slide G so as to bring the tool properly in contact with the grind stone, turn the grind stone, thereby causing the carriage D to travel backward and forward on its supporting base carrying the tool across the face of the grind stone until the tool is properly sharpened or until the grind stone face is properly dressed off, as the case may be.

Having described my invention, I claim:

The combination with a grind stone frame having a lateral extension adjacent to the cylindrical grinding face of the grind stone, with an attachment comprising a base provided with means whereby said base may be adjustably and removably fixed to said extension, a carriage movable upon the base in a path parallel with the axis of the grind stone, mechanism mounted upon said base for moving said carriage backward and forward along said path, a slide upon the carriage adjustable toward and from the grind stone, means whereby a tool holder may be removably and adjustably secured upon said slide, a sprocket wheel mounted upon said attachment and suitably connected with the carriage operating mechanism, said sprocket wheel being adapted to be driven by a sprocket chain from the shaft of the grind stone.

In testimony whereof, I hereunto affix my signature in the presence of two witnesses.

DAVID I. STERLING.

Witnesses:
P. J. MORRISSEY,
JOHN C. MCGINNESS.